(12) United States Patent
Hirsbrunner et al.

(10) Patent No.: US 6,999,770 B2
(45) Date of Patent: Feb. 14, 2006

(54) SELECTIVE HAIRPINNING OF CALLS THROUGH ANOTHER NETWORK

(75) Inventors: Alex P. Hirsbrunner, Bloomingdale, IL (US); Jheroen P. Dorenbosch, Paradise, TX (US); Niranjan N. Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 39 days.

(21) Appl. No.: 10/748,091

(22) Filed: Dec. 30, 2003

(65) Prior Publication Data

US 2005/0143088 A1 Jun. 30, 2005

(51) Int. Cl.
*H04Q 7/20* (2006.01)
(52) U.S. Cl. .................... 455/445; 455/461; 455/417; 455/465; 455/426.1
(58) Field of Classification Search ..... 455/424–426.2, 455/432.1, 435.1–453, 465, 462, 417, 455; 370/331, 335, 342
See application file for complete search history.

(56) References Cited

U.S. PATENT DOCUMENTS

| | | | |
|---|---|---|---|
| 5,063,591 A | | 11/1991 | Jodoin |
| 5,943,333 A | * | 8/1999 | Whinnett et al. ........... 370/345 |
| 6,122,270 A | * | 9/2000 | Whinnett et al. ........... 455/436 |
| 6,389,279 B1 | * | 5/2002 | Calabrese et al. .......... 455/417 |
| 6,393,289 B1 | * | 5/2002 | Bunting et al. ............. 455/445 |
| 6,526,131 B1 | * | 2/2003 | Zimmerman et al. .. 376/106.09 |
| 6,529,735 B1 | | 3/2003 | DeBrito |
| 6,574,486 B1 | | 6/2003 | Labban |
| 6,625,132 B1 | | 9/2003 | Boettger et al. |
| 6,640,108 B1 | | 10/2003 | Lu et al. |
| 6,701,145 B1 | * | 3/2004 | Payne et al. ................. 455/417 |
| 6,711,147 B1 | | 3/2004 | Barnes et al. |
| 6,766,171 B1 | | 7/2004 | Pan et al. |
| 6,823,065 B1 | | 11/2004 | Cook |
| 2002/0085516 A1 | | 7/2002 | Bridgelall ................... 370/329 |
| 2002/0095486 A1 | | 7/2002 | Bahl |
| 2004/0219948 A1 | | 11/2004 | Jones |
| 2004/0264410 A1 | * | 12/2004 | Sagi et al. ................... 455/436 |
| 2005/0048967 A1 | * | 3/2005 | Hoglander et al. ....... 455/426.1 |
| 2005/0078812 A1 | * | 4/2005 | Batni et al. ............ 379/207.16 |

FOREIGN PATENT DOCUMENTS

| | | |
|---|---|---|
| EP | 1318644 A1 | 11/2003 |
| WO | WO9948312 | 9/1999 |
| WO | WO 02/054820 A2 | 7/2002 |
| WO | WO03/006582 A1 | 1/2003 |
| WO | WO 03/065682 A1 | 8/2003 |

* cited by examiner

*Primary Examiner*—Joseph Feild
*Assistant Examiner*—Kamran Afshar
(74) *Attorney, Agent, or Firm*—Jeffrey K. Jacobs

(57) ABSTRACT

A wireless communication unit (200) and corresponding method (500) selectively routes calls originated in one wireless communication network (105) through another wireless communication network (104, 108, 110). The communication unit comprises a transceiver (203) suitable to support an air interface with a first wireless communication network and with a second wireless communication network; a user interface (211) operable to initiate a call to a number of a target unit; and a controller (209), coupled to the transceiver and the user interface, and operable, responsive to the call initiation and when the wireless communication unit is operating in the second wireless communication network, to selectively hairpin the call through the first communication network.

24 Claims, 5 Drawing Sheets

SELECTIVE HAIRPINNING OF CALLS THROUGH ANOTHER NETWORK

FIELD OF THE INVENTION

The present invention relates in general to wireless communication units and wireless networks, and more specifically to methods and apparatus for selectively routing or hairpinning calls through one such communication network while operating on another communication network.

BACKGROUND OF THE INVENTION

Wireless Local Area Networks (WLANs) are being contemplated or are known. Such WLANs are typically supported by WLAN controllers or servers, which may alternatively be referred to as private branch exchanges (PBXs) or enterprise servers. The PBX normally provides a control and switching function between the public switched telephone network (PSTN) and the WLAN and within the WLAN for communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs) such as conventional cellular telephone systems are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. In situations, sometimes referred to as loosely coupled systems, e.g. the WAN is intercoupled to the WLAN only via the PSTN, a communication unit operating on the WAN can experience problems. Generally there is a bias for operating on the WLAN, if that service is available, given the economic and utility issues suggested above, however a handover of an ongoing call, particularly a handin, e.g. from the WAN to WLAN given the loosely coupled nature of these independent networks, can be problematic.

One solution for the handin that has been proposed is for the operator to route calls originated by a wireless communication unit in a WAN through the WLAN. This is referred to as hairpinning the call through the WLAN (the name "hairpinning" follows from a diagram of the resultant routing path). While this approach facilitates a subsequent handin of the call if the wireless communication unit transitions to the WLAN, it also presents problems. For example, it requires operator intervention and may not be economical depending on tariffs for the additional call legs from the WAN to the WLAN and from the WLAN to the target network, particularly if a handin never occurs.

Therefore, a need exists for methodologies to support selective hairpinning of calls from a first through a second communication network.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
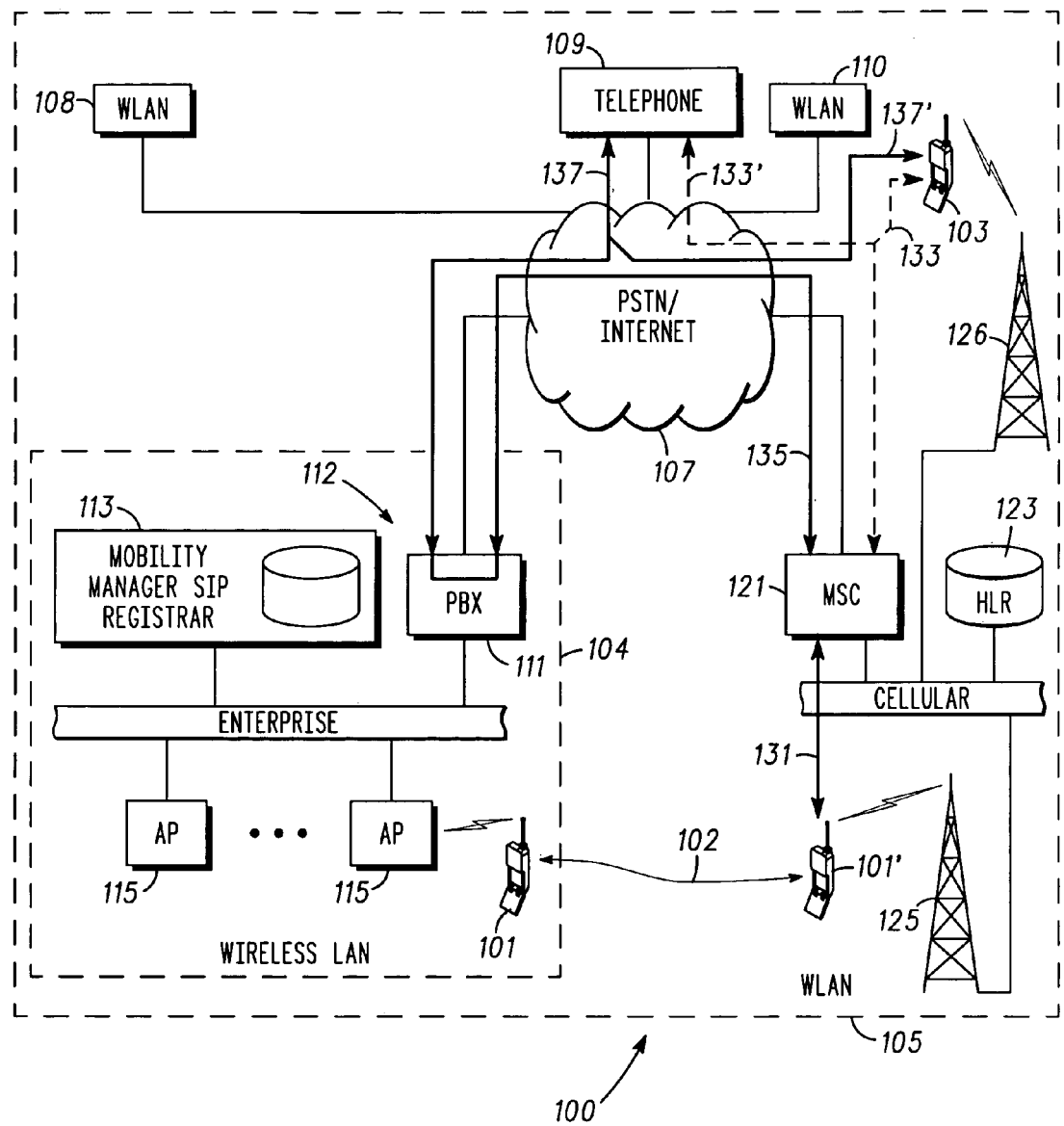
FIG. 1 depicts, in a simplified and representative form, an exemplary system diagram where selective hairpinning of a call through a communication network when the call is originated in another communication network can be implemented.

In overview, the present disclosure concerns wireless communication devices or units, often referred to as communication units, such as cellular phone or two-way radios and the like, and communication networks or systems that provide services such as voice and data communication services to or for such communication units. More particularly various inventive concepts and principles are embodied in systems or constituent elements, communication units, and methods therein for providing or facilitating hairpinning calls and thus when appropriate handover or handin of an ongoing communication or call between the communication unit and another communication unit, the handin from a first communication network to a second communication network. Note that communication unit may be used interchangeably herein with wireless subscriber device or unit and each of these terms denotes a device ordinarily associated with a user and typically a wireless communication unit that may be used with a public network in accordance with a service agreement or within a private network. Examples of such units include personal digital assistants, personal computers equipped for wireless operation, a cellular handset or device, or equivalents thereof provided such units are arranged and constructed for operation in these different networks and advantageously in accordance with the concepts and principles discussed and disclosed here.

The communication systems and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5 G and 3 G systems such as UMTS (Universal Mobile Telecommunication Service) systems, 4 G OFDM (Orthogonal Frequency Division Multiplexed) systems, integrated digital enhanced networks and variants or evolutions thereof. Furthermore the wireless communication units or devices of interest have alternative, typically short range wireless communication capability normally referred to as WLAN capabilities, such as IEEE 802.xx (802.11a,b,g, 802.15.x, etc.), Bluetooth, HiperLan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate a handin, via selective routing or hairpinning, of a call or ongoing communication or communication link from a first wireless communication network (first network) to a second wireless communication network (second network). This selective hairpinning of a call is facilitated in some embodiments by determining the likelihood, probability, or chances of a call or pending call being handed in from the communication network where the call will be originated to another communication network. Hairpinning is used here for a technique where a number (hairpin number) that terminates at or on another network is called and then information corresponding to the target number is transferred and utilized by the other network to place the call to the target unit. Hairpinning is a technique that may be used to facilitate a handin from one communication network to another where these networks are loosely coupled, e.g. inter network communication is only available via the public switched telephone network. In this manner, advantageously a handin of a call may be accomplished when there is a chance of a handin occurring and yet costs, such as extra tolls associated with additional call legs and search costs, such as shortened battery life associated with looking for the other communication network can be avoided.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, an exemplary and representative environment or system diagram for a loosely coupled communication network 100, where methods and apparatus facilitating the selective hairpinning of a call through a communication network when the call is originated in another communication network can be advantageously implemented, will be discussed and described. In one embodiment, a wireless communication unit is operating in a second communication network, such as a wireless WAN, and is initiating a call or determines that initiation of a call is imminent where the call is or will directed to a number of a target unit and operates to selectively hairpin the call through a first communication network, such as a wireless LAN.

The diagram of FIG. 1 generally shows communication units 101, 103 (two depicted for simplicity's sake) that are portable or mobile and that can move (depicted generally by arrow 102 and communication unit 101') throughout a service area of a first wireless communication network (first network) 104 or a service area for a second wireless communication network (second network) 105 or both. These wireless communication units 101, 103 ordinarily have a first network number and IP address so that other units can contact the unit in the first network as well as a second network number or ID (identifier) so that other units can contact the unit in the second network. Note that in practical systems there may be a multiplicity of such wireless communication units where for the sake of simplicity two have been depicted.

In this exemplary embodiment, the first network 104 is or includes a wireless local area network (WLAN) using packet data based methodologies including VoIP (Voice Over IP) and the second network 105 is, in one embodiment, a WAN, such as a cellular voice or packet data network or other cellular or cellular like network otherwise referred to as a wireless or cellular WAN or simply WAN. While the arrow 102 and alternative locations for wireless communication unit designated 101' suggest physical movement, this may not be the case since the WAN likely has overlapping coverage with the wireless LAN. The arrow may simply denote a change in which network the communication unit is operating or registered on for a variety of reasons. The first communication network or wireless LAN is inter coupled to the second communication network as well as various other communication devices such as plain old telephone set (POTS) 109 or IP phones by a public network, such as the public switched telephone network or Internet 107.

Note that in addition to the WLAN 104 additional WLANs 108, 110 are depicted. These may be essentially independent WLANs with requisite controllers, switching functions, and so forth, such as independent sites or buildings for a given business or enterprise or different enterprises. The WLANs 108, 110 can also represent different hotspots for wireless LAN traffic, such as different restaurants or coffee shops or locations within a shopping mall or airport or perhaps employee homes or remote offices that are associated with the enterprise represented by the WLAN 104. Typically in these hot spot situations or circumstances the WLAN, e.g. 108, 110 will often be essentially a radio access network and perhaps router and long distance link, with essential intelligence or switching functions deployed at another site. In either situation, unless otherwise stated or required by the substance of the discussion when the term WLAN or first network is used herein the collection of the networks or WLANs 104, 18, 110, etc. is intended.

In more detail, the first network 104 in a wireless LAN embodiment includes a communications network controller 112 comprising in certain embodiments a switching function 111 that may alternatively be referred to as Private Branch Exchange (PBX), enterprise server, media gateway controller (MGC) and so on and an optional mobility manager 113. The PBX 111 and mobility manager 113 are inter coupled via the Enterprise infrastructure or wired portion of the LAN as well as further coupled to one or more or a plurality of access points 115. The access points support the wireless LAN air interface with the wireless communications units using, as noted earlier, a known protocol and associated techniques, such as one or more IEEE 802.xx protocols.

The first network 104 in one or more embodiments further relies on and utilizes an application level protocol for managing connections or sessions between the various network entities including wireless communication units. This protocol in one embodiment is a known Session Initiation Protocol (SIP) but other similar protocols, such as H.323, with similar functionality could be used. The protocol, known as H.323, is defined and promulgated by the International Multimedia Telecommunication Consortium (IMTC) (see http://www.imtc.org/h323.htm and associated websites for descriptive documents). The Session Initiation Protocol (SIP) is defined by the Internet Engineering Task Force (IETF) in a document designated RFC3261. Much of the discussion below, where relevant will assume that SIP and SIP constructs and entities are being utilized in the WLAN and that cellular or dispatch protocols are being utilized in the WAN, where it is understood that similar functions and methods are available using other protocols if desired.

The mobility manager 113 includes, in the SIP embodiment, a known SIP Registrar, SIP Proxy, etc. The mobility manager 113 is responsible for maintaining network contact information (sometimes referred to as location information) for the various wireless communication units and thus is utilized by network entities as a central point for setting up connections or sessions with other network entities. The mobility manager will be described in further detail below with reference to FIG. 3.

The second network or WAN 105 includes a network controller or switching function 121, alternatively referred to as a mobile switching center (MSC). The MSC is coupled to a home location registrar (HLR) 123 and numerous base transmitter sites (BTS) 125, 126, all as known. The MSC 121 further comprises a visitor location registrar (VLR not specifically shown) as is known. The BTS 125 supports the air interface with the wireless communication units, such as units 103, 101', e.g. units 103, 101 when these units are in the coverage area of and operating on the second network. Note that first and second networks will be used in the description but these terms may be interchanged, e.g. the first network could be a WAN and the second network a WLAN, or both could be WLANs for example, provided the appropriate functionality is available within such networks.

Also it will be appreciated that other entities or functions that are part of typical networks are not specifically shown but understood to be present and operational. For example in the first network 104 or WLAN, in addition to a multiplicity of Access Points 115 supporting wireless links with wireless communication units and thereby coupling the units to the balance of the network or enterprise network and PSTN, other typical network routing equipment such as servers, concentrators, routers, etc. may be present. The second network or wireless WAN (hereafter WAN) similarly typically includes a plurality of base transmitters and antenna towers as well as base site controllers that all serve to provide a radio access network for communication units as well as the various registrars, billing servers and so forth. Note that while the first and second networks 104, 105 are referred to as wireless networks, much of these networks or the respective elements thereof are inter coupled using terrestrial based links, e.g. cables or wires. For example, the controller functions 112, 121 are normally coupled to the balance of their respective networks using known cables or wires. Furthermore the WLAN 104 can include and support voice services for stationary or static communications units that are coupled to the network using conventional cabling or wires. Thus the discussions below may refer alternatively to the first communications network 104 as a WLAN or LAN.

With this network architecture where the networks are loosely coupled and thus the WAN is not aware of the wireless LAN (the two networks are only coupled via the public network), problems associated with handovers of ongoing communications or calls can be presented. Also opportunities for selectively routing calls for billing purposes and so forth may be presented. One of these problems or opportunities is presented when a call is initiated in the second network or WAN 105 and it is desirable to have that call available at or routed through the first network or WLAN 104. One approach alluded to above that can be used in this example is hairpinning the call through the first network or WLAN as further suggested by FIG. 1. Wireless communication unit 101' initiates or originates a call 131 that will be coupled via the associated BTS 125 to the MSC 121. Note this call can be intended for another communications unit, such as the wireless communication unit 103 or the POTS 109 as depicted by the dashed call flow lines 133, 133'.

In this instance, advantageously, the communication unit has elected to and then automatically and selectively hairpinned the call through the first network 104 as shown by call flow lines 135, 137, 137' (note that 137' would actually go through the MSC and then back to unit 103). This is accomplished by substituting for the target number (WAN number of wireless communication unit 103, or PSTN number of POTS 109) a hairpin number that terminates at or on the first network 104 or controller and then transferring information corresponding to the number of the target unit to the first network 104. The first network or WLAN 104 then places a call to the target unit, e.g. 137 or 137' and connects the call legs 135 and 137, 137' together. With this network discussion and description, the balance of these discussions will be devoted to various advantageous and further inventive concepts and principles embodied as one or more apparatus and methods for facilitating one or more forms of this selective hairpinning.

Figure 2:
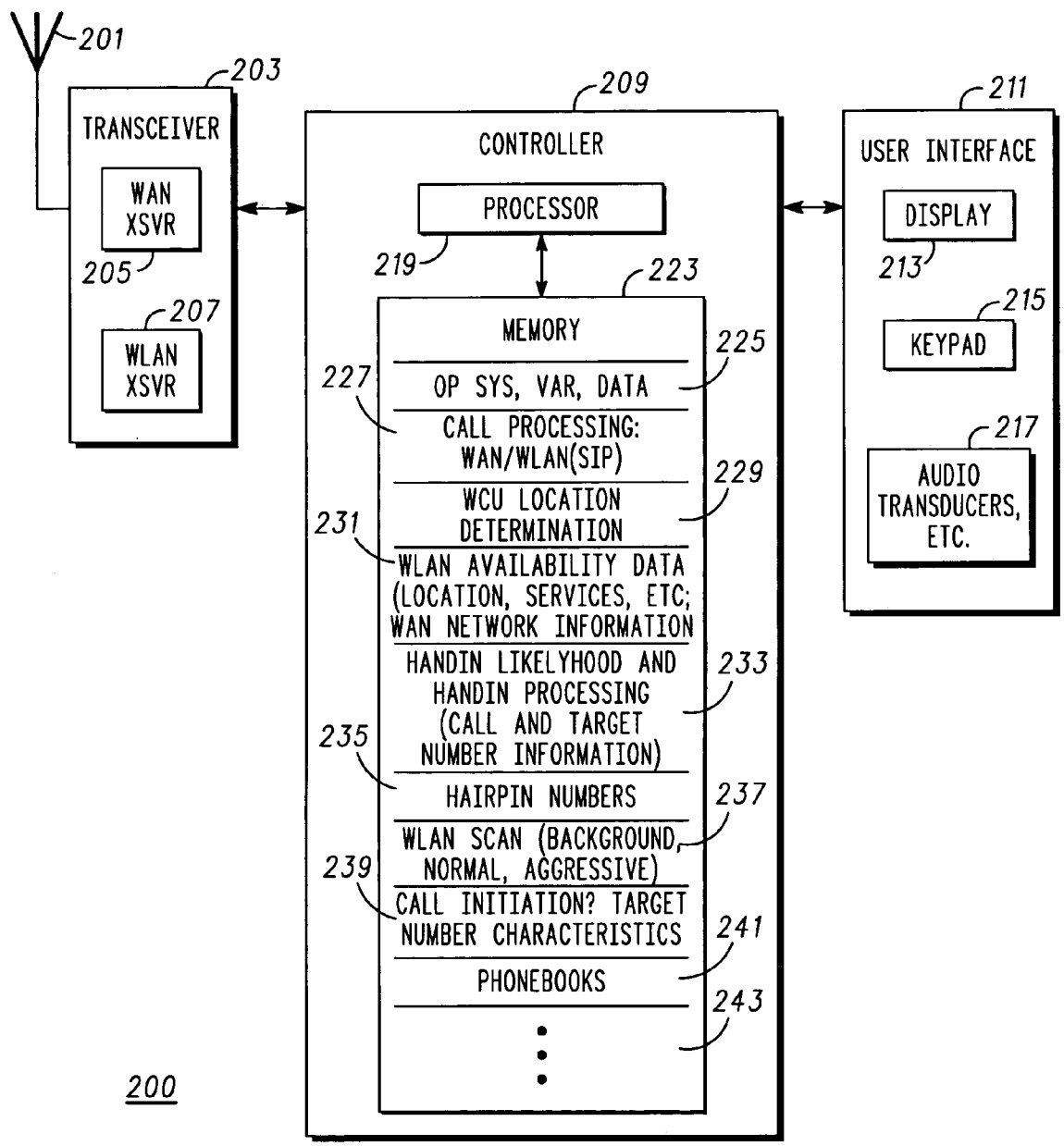
FIG. 2 depicts a simplified block diagram of a wireless communication unit arranged for facilitating selective hairpinning of a call in the system of FIG. 1.

Referring to FIG. 2 a simplified block diagram of a wireless communication unit, similar to communication unit 101 that is arranged for facilitating selective hairpinning of a call within the system of FIG. 1 will be discussed and reviewed. The communication unit 200 is structurally similar or identical to communication units, such as wireless handsets, available from manufacturers like Motorola, however the functionality of these conventional units is modified according to the principles and concepts disclosed and described herein in order to enjoy the advantages noted. The communication unit includes an antenna 201 coupled to a transceiver 203. The transceiver 203 is composed of at least one transmitter/receiver but may, as depicted, be comprised of one or more WAN transceivers 205 (one shown) and one or more additional wireless LAN transceivers 207 (one shown). In one embodiment, one transmitter/receiver 205 is for communicating over a wide area network (WAN) (second network) while another transmitter/receiver 207 is for communicating over a wireless LAN) first network). These transceivers and their functionality are generally known and whether embodied as one or several transceivers will depend on technologies employed as well as the air interface technologies utilized in the specific WANs and LANs that the communication unit is configured to interface to or interact with.

The transceiver 203 is coupled to a controller 209 and the controller is further coupled to a user interface 211. The controller 209 provides over all control for the communication unit, call processing, and interfacing tasks associated with the transceivers and user interface. The user interface includes a conventional display 213, a keyboard or keypad 215, audio transducers 217, and the like. The controller 209 further comprises a processor 219 and a memory 223 for storing software instructions and other information and data, the memory and processor inter coupled as depicted, as well as likely other known functionality that is not relevant to the present discussion. The processor is comprised of one or more general purpose processors and digital signal processors available from various suppliers, including Motorola. The memory 223 can include both volatile and non-volatile memory and can be at least in part integral to the processor 219 or may also be external to the processor and include elements from, for example, a known SIM card.

The memory includes various software routines or programs and data including an operating system with variables and data 225 that when executed by the processor results in the controller performing the above generally identified duties as well as those tasks described below in conjunction with other routines. The other routines or programs include call processing routines 227 for WAN and WLAN networks further including for example, SIP messaging, that are generally known and will vary with the specific requirements of the networks that are being utilized for service. Other routines and databases will be listed and their respective functionality will become evident with the detailed explanations below. These routines include a wireless communication unit (WCU) location determination routine 229; data or database comprising WLAN (first network) availability data 231, including for example, location, services, calendar and clock info, WAN network data, e.g. cell site IDs; handin likelihood and handin processing routines including for example call and target number information 233; hairpin number(s) or corresponding information 235; network scanning routines, such as WLAN background and aggressive scanning algorithms 237; routines for determining whether a call initiation is pending or likely as well as target number characteristics 239; Phone books and assorted information 241; and various other routines and databases 243, such as user specific data, e.g. appointments, etc., user interface drivers, and various applications, that are not specifically shown and in many instances not further relevant but that will be evident to one of ordinary skill.

In operation, the communication unit 101, 103, 200, as discussed above, is capable of and arranged and constructed for operating on or operation within a loosely coupled communication network comprising multiple communication networks, such as wireless LAN 104 and wireless WAN 105. The wireless communication unit comprises the transceiver 203 that is configured to support an air interface with a first communication network, for example wireless LAN 104 and an air interface with a second communication network, for example WAN 105. Furthermore the communication unit comprises the user interface 211 that is operable to initiate a call to a number of a target unit or otherwise indicate or suggest that initiation of such a call is imminent (recall phone numbers, etc) and the controller 209 that is coupled to the transceiver and the user interface. The controller 209 is arranged and operable, responsive to the call initiation and when the wireless communication unit is operating in the second wireless communication network, e.g. WAN 105, to selectively hairpin the call through the first communication network, e.g. WLAN 104 using the hairpin processing routines 233 and hairpin numbers 235. Note that in certain embodiments, activity at the user interface can be used by the controller to determine that a call will be or is likely to be initiated. In these situations the controller cooperatively with the transceiver can implement procedures preparatory to hairpinning a call.

In some embodiments the controller 209 in order to selectively hairpin the call through the first communication network is further operable to determine when the call is likely to be handed into the first communication network using the routines 233; and when or if the call is likely to be handed into the first communication network, to hairpin the call through the second communication network. In this manner when there is no or little chance of the call being handed into the first network, costs such as battery capacity or tolls, and various efforts undertaken to effect a hairpin can be avoided.

In order to hairpin the call through the first communication network, the wireless communication unit 200, specifically the controller 209 cooperatively with the transceiver 203 is further operable to call a hairpin number (from the hairpin number database 235), the hairpin number or corresponding call terminating at the first communication network and transfer, using the routines 233, information corresponding to the number of the target unit to the first communication network. The hairpin number can be a toll free number or other number stored in a memory 223 at 235 associated with the controller. The hairpin numbers can be received from the first communication network when the wireless communication unit is associated or operating on the first network, may be provided when the unit is initially configured for deployment, or may be programmed by a user of the communication unit from time to time. The number, e.g. hairpin number can be a number that terminates on a proximate communication network or nearest WLAN.

Note also that while we will discuss a call or calls and termination of the call on a network, that calls can comprise a control path or collection of control legs in addition to a bearer path or collection of bearer legs and that the control and bearer paths need not be identical. The important issue for the present disclosure is the control path and thus when a call is hairpinned or routed in some manner what is intended is that at least the control path or one or more control legs are hairpinned or routed in such a manner. Whether the bearer path follows the same routing is not as relevant.

Note also that the selective hairpinning, specifically the determining whether a call is likely to be handed in to the first network and the actual hairpinning, e.g. wherein the controller is operable to call the hairpin number and transfer the information, can be performed or executed in a manner that is automatic and transparent to or invisible to a user of the wireless communication unit. Alternatively, if desired, the selective hairpinning can include an operator prompt provided on the user interface 211 for approval of the hairpinning. If there are alternative hairpin numbers that can be used, e.g. alternative routes, an operator prompt can be provided that allows the user to select or approve a selected route or hairpinning network can be provided.

Typically, the information corresponding to the number of the target unit that is transferred will be the number of the target unit as, for example, an over dialed DTMF (dual tone multiple frequency) signal. Alternative approaches for this transfer are also contemplated. For example, a packet data based message, e.g. SIP message or some proprietary message, including some identifier for the target unit that allows the first communication network or controller therefore to identify the target unit and route the call to the target unit's number, may be used. Alternatively the target number may be included in the initial call setup message to the first communication network 104, for example by adding the target number to the end of the hairpin number as redundant digits.

The wireless communication unit, specifically the controller in order to determine when the call is likely to be handed into the first communication network can utilize or ascertain various forms of data or circumstances to make the determination. For example, whether the call is likely to be handed into the first communication network can be based on determining a location of the wireless communication unit using location determination routines 229, availability of the first communication network using routines 231 or sub-portion, such as a radio access portion thereof, or characteristics of the call using routines 239, e.g. appropriateness or desirability of using the first network for routing the call.

The location of the wireless communication unit can be latitude-longitude coordinates from for example a GPS receiver (not shown) or other known means such as triangulation of signals and the like to obtain such coordinates. The location can also be based on determining information corresponding to the second network, e.g. WAN, such as serving cell site identifiers, which implies a geographic location of the communication unit. Given the location of the communication unit, the controller 209 is further operable to compare the location of the wireless communication unit to location information corresponding to the first communication network, e.g. WLAN 104, 108, 110, and when the comparison is favorable to scan for the first communication network using the scanning routines 237. The information corresponding to the WLAN would include, for example, locations (latitude-longitude or perhaps WAN cell site IDs) where it is expected that the first network, e.g. WLAN, is available. Given that the WLAN is likely available it is appropriate to scan for the network or corresponding access points, where scanning refers, for example, to the process of searching for a beacon signal and when found and if appropriate associating with an access point. Note that the controller in cooperation with the transceiver, in order to scan for the first communication network, can be further operable to aggressively scan for the first communication network but in some embodiments only when, for example, the wireless communication unit is engaged in the call on the second communication network or the controller determines that the call may be initiated. Typically there will be some background scanning activity, for example once each 5 minutes, however this can switch to a normal, e.g. once each 30 seconds or even aggressive scan algorithm, once each 10 seconds via the routines 237 when a WLAN is expected to be available. In this manner, battery capacity will not be unnecessarily expended on useless scanning activity.

Determining availability of the first communication network, e.g. WLAN, can consider in addition to or in lieu of geographical location information, various other circumstances or particulars as well. Note that availability includes actual as well as potential availability. Availability may also encompass suitability, namely whether the services offered, quality of services, security services, etc, by a WLAN satisfy the requirements of the communication unit and the actual or pending call to be originated. As another example of circumstances that can be considered day and time can be utilized as an indicator of availability or likelihood of a handin to the first network. For example, if the day is Monday through Friday and the time is between 7 and 8 AM it may be appropriate to hairpin calls through the WLAN or at least to determine whether the WLAN can be found via an appropriate scanning algorithm, when a call is being originated. Under these conditions the user is likely in transit to the office and any call that is made may well end up being a candidate for a handin to the WLAN. Note also that the controller can operate in terms of determining availability of the first communication network to learn geographical location information corresponding to the first communication network. This information can be sent to the wireless communication unit or alternatively the unit can associate its location with situations where the first communication network has been located on previous occasions. As the information is received or otherwise "learned" it can be stored in the memory at 231. Note also that when the second communication network is a wide area network and the first communication network is a wireless local area network, the call will only need to be hairpinned through the first network when the number of the target unit corresponds to a number other than a number terminating at the first communication network.

Note that when there are a plurality of WLAN s, such as WLAN 104, 108, 110, the different WLANs may use a common hairpin number. Even with a common hairpin number, such as some known toll free numbers, e.g. some WATS numbers, this number can terminate on different WANs depending, for example, on originating location. In other embodiments, the different WLANs may use different hairpin numbers that are stored in the hairpin number database 235. The hairpin number database 235 may store linking information (not shown) along with the hairpin numbers, where the linking information links hairpin numbers to the WLAN availability data 231 of the associated WLANs. Given the location of the communication unit, the controller 209 is then further operable to compare the location of the wireless communication unit to location information corresponding to the first communication network, e.g. WLAN 104, 108, 110, and when the comparison is favorable to use the linking information stored in memory to determine the correct hairpin number for the WLAN.

Figure 3:
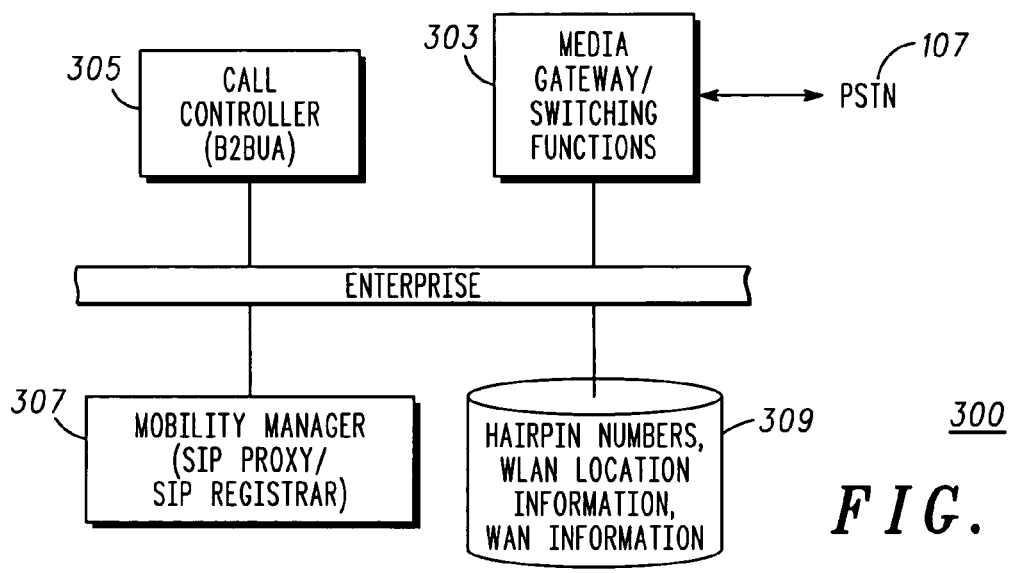
FIG. 3 depicts a simplified block diagram of a network controller for facilitating selective hairpinning of a call.

Referring to FIG. 3, a simplified block diagram of a network controller 300, such as the network controller 112, for facilitating selective hairpinning of a call in the system of FIG. 1 will be discussed and described. The network controller 300 may serve a single enterprise location, such as an office building or may serve multiple enterprise sites, possibly located in different cities. The network controller 300 or enterprise server may serve a WLAN hotspot, or multiple WLAN hotspots 108, 110. It may also serve one or more WLAN coverage areas in private homes that may be connected to the network controller 300 by such means as IP broadband connections. Generally the network controller operates to establish connections between wireless communication units within the WLAN, such as communication unit 101 and various peer communication units (not shown). Note that the connection from the wireless communication unit via an access point 115 is a packet data connection and the connection from the peer communication unit will depend on the particulars for the peer unit. For example if the peer communication unit is another static or wireless communication unit within the WLAN or LAN (not shown) the connection will also be a packet data based connection, while if the peer unit is an ordinary phone, such as POTS 109, or a wireless communication 101', 103 outside the LAN or WLAN 104 the connection to/from the wireless LAN is often a circuit switched voice connection.

The communication network controller 300 comprises a gateway or switching function 303 and a call controller or controller 305 including a B2BUA (back to back user agent, a SIP entity) such as available from Avaya with their MultiVantage product line. Rather than the B2BUA a conventional SIP server can be used. Generally the gateway or switching function operates to couple the wireless LAN and devices therein to the PSTN 107 and thus external phones, such as POTS 109, and other networks, such as the WAN 105. More specifically the switching function is routing traffic or calls between the various devices and networks. The controller 305 is responsible for call control and call signaling and handling on-hold or call waiting calls, hairpinned calls, etc. and handling connections of these calls among particular communications units. The B2BUA is included as part of the controller 305 to facilitate an interface using SIP constructs between the controller and the rest of the LAN including access points, communications units, the switching function 303, a mobility manager 307, and a server 309.

The mobility manager 307 is included in certain embodiments of the network switch 300 and further often comprises a SIP Proxy and SIP Registrar. The mobility manager 307 operates to facilitate mobility of the wireless communication units within the wireless LAN as well as between networks. This includes facilitating handover (handin or handout) and hairpinning activities for active calls and on-hold calls associated with communication units from one to the other network or within the wireless LAN when required. The SIP proxy and SIP Registrar operate according to known techniques to provide a central point or network address that all communication units can contact when they intend to set up a call or connection with another unit. The proxy server/SIP Registrar will have the most up to date network contact or location information for or address, e.g. know where to find, another communication unit or the network switching function 110 in accordance with known techniques. The mobility manager and constituent functions in one or more embodiments can be implemented as software programs running on a general purpose, computing platform, such as those available from suppliers, like Hewlett Packard and Dell, are suitable for networked operation.

Additionally, in some embodiments, the server 309 is included and operates as a memory associated with the controller 305 or mobility manager 307 for storing hairpin numbers, WLAN location information, WAN information and the like. The server 309 may be a separate entity or be part of the mobility manager or call controller. The switching function 303, call controller 305, mobility manager 307, and server 309 are all inter coupled or networked via the LAN as depicted. Note that one or more or all of these entities may be co-located in one or more common computing platforms according to the practitioner's desires and thus may be viewed as largely logically distinct entities. Generally the functionality of these entities and interaction thereof are known and will not be further reviewed but will be modified in accordance with the concepts and principles herein in order to enjoy the advantages thereof. The discussions below will be devoted to the respective and relevant functionality and interaction of these respective entities with each other as well as other network entities pursuant to facilitating hairpinning of calls from a wireless communication unit.

Thus in operation, the network controller 300 in addition to other duties is operable to facilitate hairpinning calls from a wireless communication unit 101', 103. The network controller comprises a switching function 303 that is coupled to the local area network and the public switched network, e.g. telephone system or Internet; and a controller or mobility manager coupled to the switching function and comprising an associated memory or server 309 that is operable to provide hairpin information to the wireless communication unit. This information is provided typically when the communication unit is operating on the wireless LAN. For example, the controller provides the hairpin information to the wireless communication unit when, for example, the wireless communication unit requests the hairpin information, when for example the communication unit calls a particular number terminating on the network controller or when the wireless communication unit is or becomes associated with the local area network.

The hairpin information can include one or more of a hairpin number and information for use by the wireless communication unit in determining whether a call to be initiated by the wireless communication unit should be hairpinned. The information for use in determining whether the call to be initiated by the wireless communication unit should be hairpinned further comprises one of: geographic location information corresponding to the local area network; and network information, e.g. cell site IDs corresponding to another communication network where the cell sites are in the vicinity of a WLAN location. By providing this information to the wireless communication units an enterprise can implement for example various policies, such as always hairpin long distance calls and the like.

Figure 4:
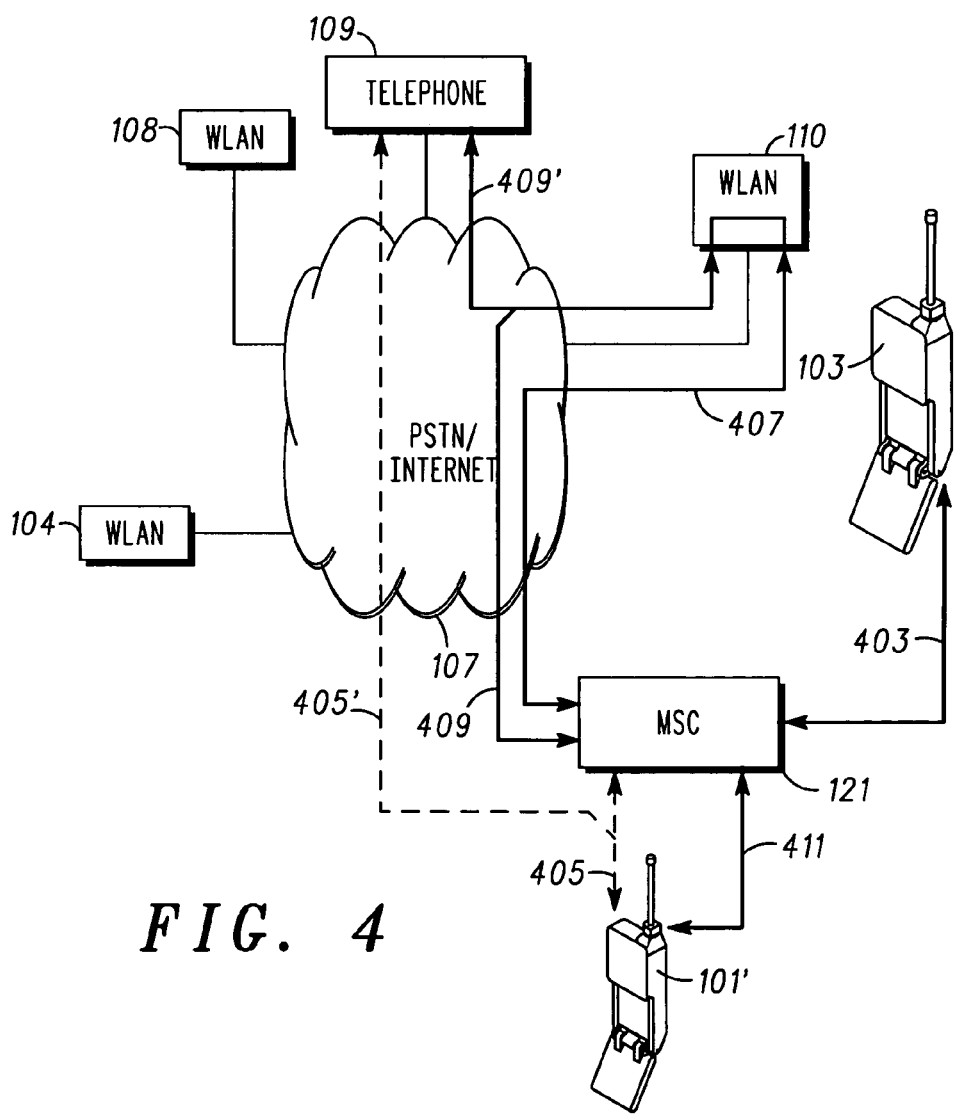
FIG. 4 depicts another embodiment of selective hairpinning in the system of FIG. 1.

Referring to FIG. 4, another embodiment of or scenario for selective hairpinning in the system of FIG. 1 will be discussed and described. Note that FIG. 4 is a simplified diagram of the FIG. 1 system where like reference numerals refer to like entities. FIG. 4 depicts and deals with a similar handin situation or hairpinning opportunity as was discussed above with reference to FIG. 1, however the particular call flows are different than those noted with reference to FIG. 1. In FIG. 4 the wireless communication unit 103 is in the process of initiating a call shown as line 403, where the call is directed to a number of a target unit, such as the communication unit 101' as suggested by the dotted line 405 or the POTS 109 as suggested by the dotted line 405'. The dotted lines 405, 405' are indicative of the call routing, e.g. from the MSC to the respective units, for the call as originated to a respective WAN or PSTN number.

However in this example the communication unit 103 practices selective hairpinning, e.g. determines there is a likelihood or desire to handin or hairpin the call through the first network, e.g. WLAN 110. This may be the result of determining, as depicted, that the unit 103 is proximate to the WLAN 110. Thus the call is initiated with a number that terminates on the WLAN 110 and after it is answered or connected information corresponding to the number of target unit (POTS 109 or unit 101') is transferred to the WLAN 110 as shown by the line 407. The WLAN or corresponding network controller forwards the call or establishes a call leg 409, 409' in order to hairpin the call through the WLAN. If the call as hairpinned or routed or forwarded is intended for the communication unit 101' the call is routed to the MSC via 409 and from there to the unit 101' via the path or leg 411. Note that likelihood as used herein suggests some probability that a call will be handed in without specifically indicating whether that likelihood is 10% or 50%. The specific numbers if available and thresholds that may be employed is left to the practitioner and the numbers that are ultimately chosen will depend on the availability of information as well as a tradeoff with economic factors or other costs (excess tolls or battery life decreases due to excess scanning for example) resulting from erroneous decisions.

Figure 5:
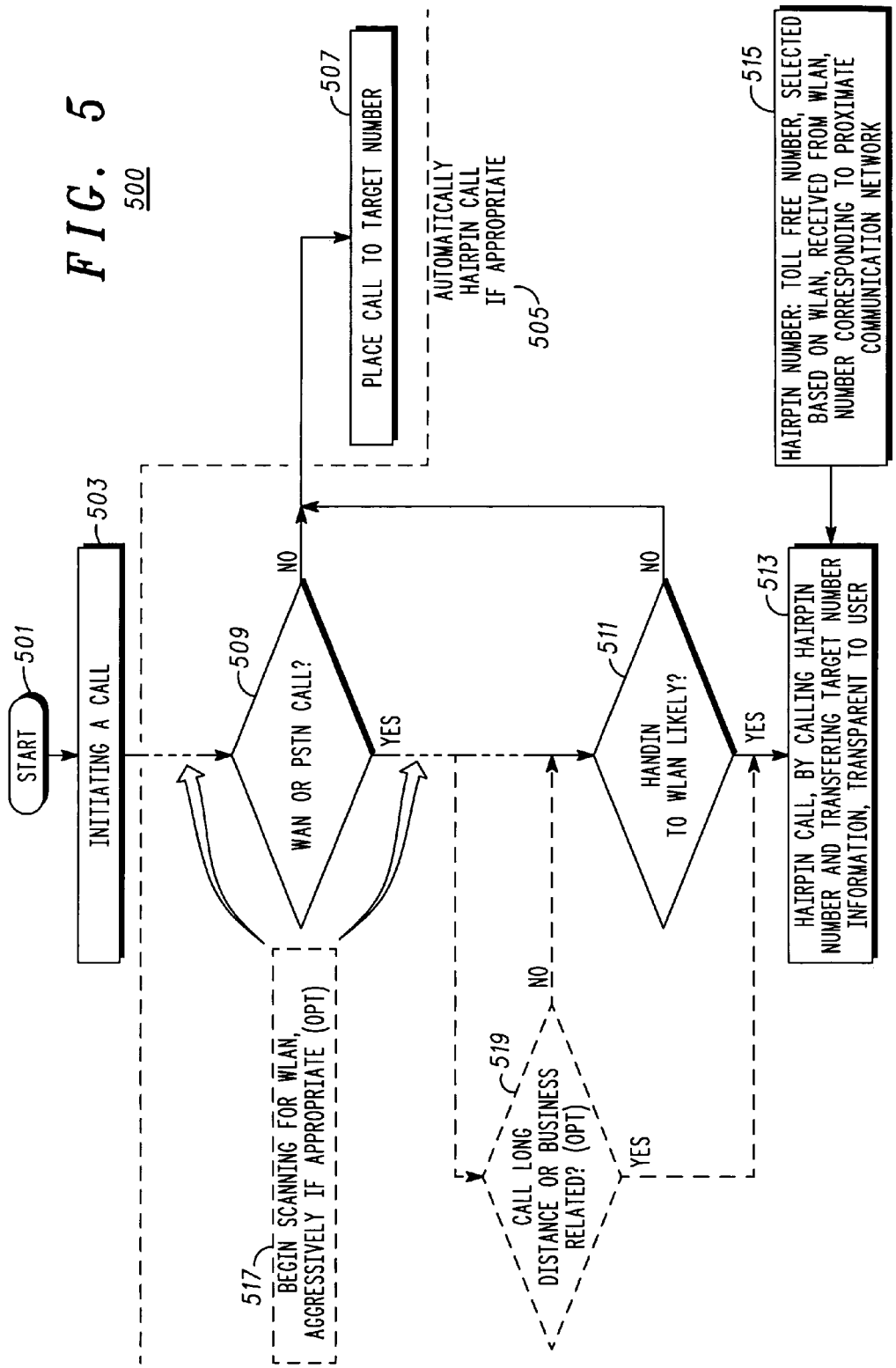
FIG. 5 illustrates a flow chart of a method embodiment of selective hairpinning of a call.

Referring to FIG. 5, a flow chart of a method embodiment of selective hairpinning of a call will be discussed and described. Note that this method can be practiced using the communication units, network controllers, etc discussed above or other similar apparatus with similar functionality. Never-the-less much of this discussion will as required reference the above figures and will be provided in an overview form in order to avoid undue duplication of some of the above discussions and descriptions. Generally FIG. 5 shows a method 500 in a wireless communication unit or similar device, where the method is directed to selectively routing or automatically hairpinning a call that is being originated. The method 500 begins at 501 and then at 503 initiating a call to a number of a target unit is shown. Note this process may also include, in the alternative, processes indicative of a call that will be initiated. After 503, at 505 the method 500 shows automatically hairpinning the call if appropriate where hairpinning is understood to mean routing the call through a first communication network when the call is being originated and terminated in a second communication network. Hairpinning is useful, for example, when the call is likely to be handed into the first communication network.

The method 500 is particularly advantageous when the second communication network is a wide area network, the first communication network is a wireless local area network, and the wireless communication unit is operable in the first and the second communication network. At 509 it is determined whether the number of the target unit corresponds to a number other than a number terminating at the first communication network, e.g. a PSTN or WAN number or call. If not, e.g. the call is a call that terminates at or on the WLAN there is no point in hairpinning the call and thus the call can be selectively placed directly to the target number as shown at 507. Note that in some embodiments the determination at 509 is optional. For example, there may be situations where the wireless communication unit or other apparatus practicing the method does not determine or perhaps can not determine whether the target number terminates at the first or second communications network. In such embodiments, if for example it otherwise appears that a handin is likely or may be desirable, the call can be routed via a hairpin number to the network controller 300. The controller is then operable to determine whether a hairpin attempt is being made for the target number, e.g. the target number terminates at the first communication network or elsewhere and if elsewhere, routes or hairpins the call elsewhere, e.g. to the PSTN or second communication network.

If the target unit and thus corresponding number is a WAN or PSTN number, then 511, further shows in certain embodiments determining when the call is likely to be handed into and should thus selectively be hairpinned through the first communication network or WLAN. There are various aspects to this determination, one noted above with reference to 509, certain of which are portrayed in FIG. 5 and some that will be discussed below with reference to FIG. 6. If the handin and thus hairpinning is likely at 513 the automatically hairpinning the call further comprises calling a hairpin number terminating at the first communication network and transferring information corresponding to the number of the target unit to the first communication network. Note that the hairpin number as suggested by 515 can be, for example, a toll free number (1-800 or standard WATS (wide area telecommunications services number), a number stored in a memory associated with the controller of the communications unit, a number received from the WLAN (first communication network), and a number that terminates on a proximate communication network or proximate WLAN. Note further that the calling the hairpin number and the transferring the information is advantageously performed in a manner that is transparent to a user of the wireless communication unit.

Note that the method 500 can further include an optional step 517 comprising beginning a scan for a WLAN, aggressively if appropriate. This process may be incorporated in the method 500 either prior to or after 509. A further optional process 519 tests, for example, whether the call is a long distance call or whether it is a business related call. If not the method continues to 511 and if so the method skips 511 and automatically and selectively hairpins the call at 513. Hairpinning of a business-related call can be particularly advantageous when the communication network controller 300 replaces the Caller ID for the call, which would normally be the cell phone number or second network number of the initiating unit, with the corresponding enterprise or first network number of that unit. Business related calls can be recognized, for example, by marking certain targets or numbers in the phonebooks 241 as business related. If the target unit and thus corresponding number is a business related number, the call is business related. Alternatively, the controller 209 may allow the user to select one of a plurality of personas for the communication unit 200 via the user interface 211, where one of the personas is a business persona, while another persona may be a leisure or private persona. All calls made while the business persona is selected are then business related calls.

Figure 6:
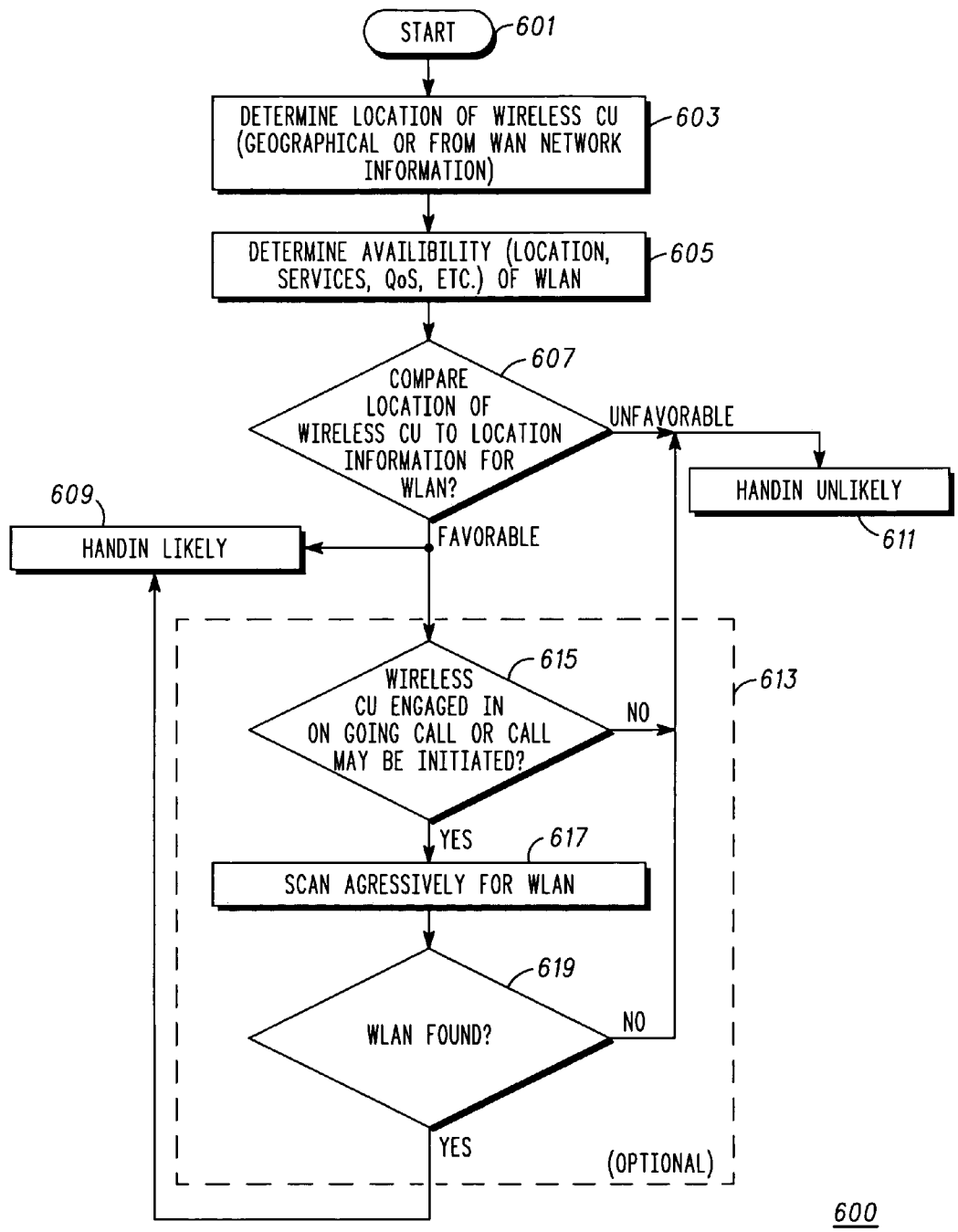
FIG. 6 illustrates a more detailed flow chart of a portion of the FIG. 5 method, specifically determining whether a handin of a call is likely.

Referring to FIG. 6, a more detailed flow chart of a portion of the FIG. 5 flow chart showing a method of determining whether a handin of a call is likely will be discussed and described. The method 600 shows a method of determining when the call is likely to be handed into the first communication network and starts at 601. Then at 603 determining a location of the wireless communication unit is performed where this location includes, for example, geographical information or information corresponding to WAN network information. Then at 605 a determination of the availability of the first communication network, e.g. WLAN is performed. Next at 607 the method shows comparing the location of the wireless communication unit to location information corresponding to the first communication network and when the comparison is favorable scanning for the first communication network and determining that a handin is likely at 609. If not favorable 611 shows deciding that the handin is unlikely. If the comparison is favorable at 607, the optional process 613 depicts determining whether the wireless communication unit is engaged in the call on the WAN or whether the call may be initiated. If not, the process goes to 611 and if so to 617 where the scanning for the first communication network further comprises aggressively scanning for the first communication network.

In this manner, initiating a call from a second network selectively results in a hairpinning the call through a first communication, for example, if a handin to that network is likely, thereby providing for increased customer satisfaction since the costs (battery life and excess tolls for example) of hairpinning all calls through the first network is avoided. It should be noted that the methods and apparatus described above for selectively hairpinning calls from one through another communication network may be implemented in reverse or with different communication networks than those utilized in the examples above. For example, the first wireless communication network may be the cellular WAN and the second network may be the WLAN.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit comprising:
    a transceiver suitable to support an air interface with a first wireless communication network and with a second wireless communication network;
    a user interface operable to initiate a call to a number of a target unit; and
    a controller, coupled to the transceiver and the user interface, and operable, responsive to the call initiation and when the wireless communication unit is operating in the second wireless communication network, to selectively hairpin the call through the first communication network, wherein the controller, to selectively hairpin, is:
    further operable to determine when the call is likely to be handed into the first communication network; and
    further operable, if the call is likely to be handed into the first communication network, to hairpin the call through the first communication network.

2. The wireless communication unit of claim 1 wherein the controller, to hairpin the call through the first communication network, is further operable with the transceiver to call a hairpin number terminating at the first communication network and transfer information corresponding to the number of the target unit to the first communication network.

3. The wireless communication unit of claim 2 wherein the hairpin number is one of: a toll free number, stored in a memory associated with the controller, received from the first communication network, and a number that terminates on a proximate communication network.

4. The wireless communication unit of claim 2 wherein the controller is further operable to call the hairpin number and transfer the information in a manner that is transparent to a user of the wireless communication unit.

5. The wireless communication unit of claim 1 wherein the controller, to determine when the call is likely to be handed into the first communication network, is further operable to determine one of a location of the wireless communication unit and availability of the first communication network.

6. The wireless communication unit of claim 5 wherein the controller is further operable to compare the location of the wireless communication unit to location information corresponding to the first communication network and when the comparison is favorable to scan for the first communication network.

7. The wireless communication unit of claim 6 wherein the controller, to scan for the first communication network, is further operable to aggressively scan for the first communication network only when one of: the wireless communication unit is engaged in the call; the controller determines that the call may be initiated; and the controller determines that its location is compares favorably to the location information corresponding to the first communication network.

8. The wireless communication unit of claim 5 wherein the controller, to determine the location of the wireless communication unit, is further operable to determine one of geographical location information and information corresponding to the second communication network.

9. The wireless communication unit of claim 5 wherein the controller, to determine availability of the first communication network, is further operable to learn location information corresponding to the first communication network.

10. The wireless communication unit of claim 1 wherein the second communication network is a wide area network, the first communication network is a wireless local area network, and the number of the target unit corresponds to a number other than a number terminating at the first communication network.

11. A method in a wireless communication unit of selectively routing a call that is being originated, the method comprising:
    initiating a call to a number of a target unit;
    automatically selectively hairpinning the call through a first communication network when the call is being originated in a second communication network and the call is terminating at the second communication network; and
    determining when the call is likely to be handed into the first communication network and selectively hairpinning the call through the first communication network when the call is likely to be handed into the first communication network.

12. The method of claim 11 wherein the automatically selectively hairpinning the call further comprises calling a hairpin number terminating at the first communication network and transferring information corresponding to the number of the target unit to the first communication network.

13. The method of claim 12 wherein the hairpin number is one of: a toll free number, stored in a memory associated with the controller, received from the first communication network, and a number that terminates on a proximate communication network.

14. The method of claim 12 wherein the calling the hairpin number and the transferring the information is performed in a manner that is transparent to a user of the wireless communication unit.

15. The method of claim 11 wherein the determining when the call is likely to be handed into the first communication network further comprises determining one of a location of the wireless communication unit and availability of the first communication network.

16. The method of claim 15 further comprising comparing the location of the wireless communication unit to location information corresponding to the first communication network and when the comparison is favorable scanning for the first communication network.

17. The method of claim 16 wherein the scanning for the first communication network further comprises aggressively scanning for the first communication network only when one of: the wireless communication unit is engaged in the call on the second communication network; and the call may be initiated.

18. The method of claim 15 wherein the determining the location of the wireless communication unit further comprises determining one of geographical location information for the wireless communication unit and information corresponding to the second communication network.

19. The method of claim 15 wherein the determining availability of the first communication network further comprises learning location information corresponding to the first communication network.

20. The method of claim 11 wherein the second communication network is a wide area network, the first communication network is a wireless local area network, the wireless communication unit is operable in the first and the second communication network, and the number of the target unit corresponds to a number other than a number terminating at the first communication network.

21. The method of claim 11 further comprising one of:
determining when the call is a long distance call and selectively hairpinning the call through the first communication network when the call is a long distance call, and
determining when the call is a business related call and selectively hairpinning the call through the first communication network when the call is a business related call.

22. A network controller operable to facilitate hairpinning calls from a wireless communication unit, the network controller comprising:
a switching function coupled to a local area network and a public switched telephone system; and
a call controller, coupled to the switching function and comprising an associated memory, operable to provide hairpin information to the wireless communication unit, wherein the hairpin information comprises one of: a hairpin number; and information for use by the wireless communication unit in determining whether a call to be initiated by the wireless communication unit should be hairpinned.

23. The network controller of claim 22 wherein the controller provides the hairpin information to the wireless communication unit when one of: the wireless communication unit requests the hairpin information; and when the wireless communication unit is associated with the local area network.

24. The network controller of claim 22 wherein the information for use in determining whether the call to be initiated by the wireless communication unit should be hairpinned further comprises one of: geographic location information corresponding to the local area network; and network information corresponding to another communication network.

* * * * *